United States Patent [19]

Denoel

[11] Patent Number: 4,780,346
[45] Date of Patent: Oct. 25, 1988

[54] TUBULAR LAMINATED STRUCTURE FOR REINFORCING A PIECE IN COMPOSITE MATERIAL

[75] Inventor: Jean D. Denoel, Valence, France

[73] Assignee: Societe Eruopeene De Propulsion, France

[21] Appl. No.: 35,659

[22] Filed: Mar. 26, 1987

[30] Foreign Application Priority Data

Mar. 28, 1986 [FR] France .................... 86 04531

[51] Int. Cl.⁴ ................................. B32B 7/00
[52] U.S. Cl. ..................... 428/36; 428/176; 428/262; 428/265
[58] Field of Search .............. 428/36, 262, 265, 176

[56] References Cited

U.S. PATENT DOCUMENTS 3,409,224 11/1968 Harp et al. .................... 239/33

FOREIGN PATENT DOCUMENTS 561544 5/1944 United Kingdom .

Primary Examiner—Marion C. McCamish
Attorney, Agent, or Firm—Lowe, Price, LeBlanc, Becker & Shur

[57] ABSTRACT

The structure is produced by means of a tubular braid of which the wall is folded over to form corrugations or wrinkles which constitute layers of fibrous material, superposed in axial direction, each layer extending from the inside surface to the outside surface of the structure.

9 Claims, 1 Drawing Sheet

TUBULAR LAMINATED STRUCTURE FOR REINFORCING A PIECE IN COMPOSITE MATERIAL

BACKGROUND OF THE INVENTION

The present invention relates to the production of a tubular laminated structure, and more particularly to the production of a structure comprising layers of fibrous material, superposed in axial direction, each layer extending from the inside surface to the outside suface of the structure.

The field of application of the invention is, more particularly but not exclusively, that of the production of fibrous structures of reinforcement constituting preforms for producing pieces in composite material, such as for example ablative thermal protection for solid propellant rocket motors.

Various processes are already known for producing reinforcing preforms for axi-symmetrical pieces in composite material.

One of these processes consists in stalking rings of fibrous material and optionally bonding them together, for example by needling, in order to produce a preform which is thereafter densified to obtain the desired axi-symmetrical piece. This process is suitable for producing pieces of relatively small thickness, such as brake discs, but it is no longer adapted when the pieces to be produced have a greater axial dimension.

Another process consists in winding on a mandrel yarns, tapes or strips of fibrous material in superposed layers. The layers may be bonded together in different ways, such as needling or sewing, or else by means of pins implanted on the surface of the mandrel, either so as to actually constitute radial bonding elements, or to provide a passage for radial reinforcing elements which are inserted after the winding operation.

OBJECT AND SUMMARY OF THE INVENTION

The object of the present invention is to propose a new process which also enables the production of pieces of any axial dimension, but with an increased resistance to ablation, particularly when the pieces are subjeced to high temperature gas flows.

This object is reached with a process which, according to the invention, consists in using a tubular braid and folding its wall so as to form corrugations or wrinkles which constitute the layers of fibrous material superposed in an axial direction.

It is possible, due to the deformability of the braid, to obtain a structure in which the layers can have any required orientation with respect to the axis of the structure. In particular, in the case of an application for the production of composite thermal protections, the resistance to ablation may be improved by a "sleek-hair" orientation of the fibers with respect to the gas flow.

Moreover, in each corrugation or wrinkle, the fibers extend from the inside to the outside of the tubular structure. Thus, even if the inside part of said structure is attacked by an intensely high temperature gas flow, the cold outside part of the fibers remains firmly embedded and the orientation thereof helps the discharge of the pyrolysis gases, resulting from the degradation of the inside part, without delamination of the structure.

The invention will be more readily understood on reading the following description with reference to the accompanying drawings.

DETAILED DESCRIPTION OF A PREFERRED EMBODIMENT

Figure 1:
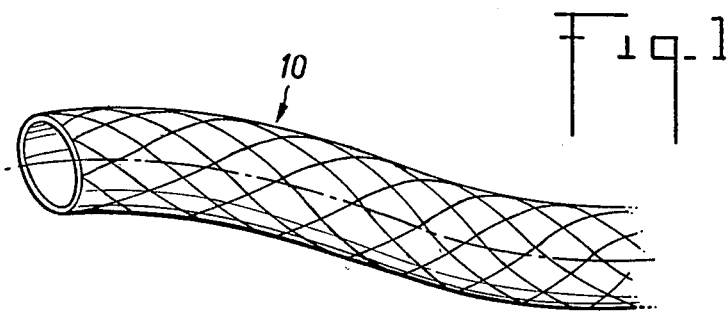
FIG. 1 is a very diagrammatical view of a braid usable for carrying out the process according to the invention.
Figure 2:
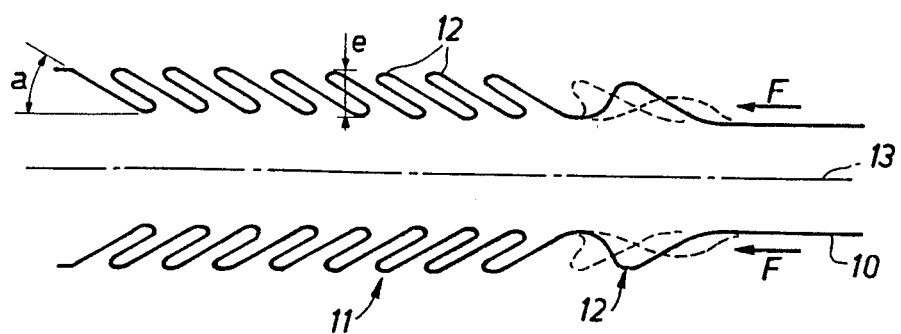
FIG. 2 illustrates very diagrammatically the formation of a tubular structure with a braid such as illustrated in FIG. 1.

Referring first to FIG. 1, this shows a tubular braid 10 which constitutes the starting product for the preparation of a structure according to the process of the invention. As illustrated in FIG. 2, the structure 11 is produced by folding the braid over itself by a translational movement parallel to its own axis (arrows F) so as to form corrugations or wrinkles 12. Said latter are applied against one another and form layers which are superposed in axial direction, each layer extending from the inside surface to the outside surface of the structure 11.

In the illustrated example, wrinkles 12 are arranged slantwise, meaning that they form an angle a with axis 13 of the structure 11, said angle a being variable between a few degrees and 90°. The amplitude of the corrugations or wrinkles 12, determines with angle a, the thickness e of the structure 11, namely the distance between the inside surface and the outside surface.

Depending on the geometrical properties of the braid (diameter, angles formed by the rows constituting the braid, etc . . . ) and making use of its ability to deform, it is possible to obtain a structure in which angle a and thickness e can be adjusted at will. For example, angle a can be equal to 90°, i.e. with wrinkles 12 perpendicular to axis 13.

The process according to the invention is applicable to the preparation of tubular structures of which the cross-section is not necessarily circular, and of which the center of gravity of the cross-section is not necessarily on a straight line. Thickness e can also be made to vary along the axis of structure 11, by modifying the amplitude and/or the inclination of the wrinkles 12.

As already indicated, the invention is more particularly applicable to the production of tubular structures constituting fibrous reinforcing preforms for the making of pieces in composite materials, and in particular ablative pieces.

The material constituting the tubular braid 10 is selected as a function of the intended purpose of the structure. In the case of a reinforcement for a composite piece destined to withstand high thermal stresses, the selected braid will be produced from refractory fibers or precursors thereof, such as for example a braid in pre-oxidized PAN (polyacrylonitrile) fibers, which is a carbon precursor. The braid is produced with the selected fibers by any of the conventional processes for producing tubular braids.

The tubular structure obtained after folding over the braid may be reinforced, for example by being subjected to a needling operation, the needling being carried out crosswise with respect to the wrinkles 12. Thereafter, in order to obtain the target composite piece, the structure is densified by through-deposition or infiltration, of a matrix-forming material such as a thermo-setting resin, carbon or other refractory material, for example of ceramic type. Various densifying methods may be used, such as the chemical vapor infiltration method, or the liquid impregnation followed by a heat treatment or else an infiltration preceded by a pre-impregnation. The material constituting the matrix, like the material constituting the reinforcing structure, is selected as a function of the desired application. It may be resin, pyrolytic carbon or another refractory material such as silicon carbide deposited by chemical vapor deposition according to a technique which is now well under control.

The structure obtained according to the invention is well adapted to the production of thermal protections, particularly for the rear extensions of solid propellent rocket motors, since the resistance to ablation caused by the flow of high temperature combustion gases may be substantially increased due to a "sleek-hair" orientation of the wrinkles 12, hence of the fibers of the structure 11. Moreover, in each wrinkle 12 the fibers start from the inside surface of the structure and extend to the outside surface. Thus, when the hot inside part of the structure becomes degraded due to the hot gas flow, the fibers located in that part remain embedded in the cold outside part and the pyrolysis gases can easily escape towards the inside of the tube without affecting its resistance.

Obviously, the process according to the invention is not limited to the production of reinforcing structures for ablative composite pieces, on the contrary, it can be applied to all cases in which a tubular reinforcing structure has to be prepared, provided that the necessary braid exists.

What is claimed is:

1. Composite piece of the type comprising a tubular fibrous reinforcing structure densified by a matrix, wherein said reinforcing structure is constituted by a tubular braid of fibrous material, the wall of which is folded over to form corrugations or wrinkles which constitute layers of fibrous material superposed in the axial direction, each layer spreading from the inside face to the outside face of the reinforcing structure.

2. Composite piece as claimed in claim 1, wherein the fibrous tubular structure is reinforced by needling.

3. Composite piece as claimed in claim 1, forming ablative thermal protection designed to be subjected to a high temperature gas flow, wherein the folds in the tubular structure are oriented slantwise with respect to the axis of the structure, and in sleek-hair manner with respect to the gas flow.

4. The composite piece of claim 3,
   wherein the fibrous material comprises a refractory fabric capable of withstanding high thermal stress.

5. The composite piece of claim 4,
   wherein the refractory fabric is a pre-oxidized polyacrylonitride fiber.

6. The composite piece of claim 3,
   wherein the reinforcing structure is densififed by through-deposition or infiltration of a material selected from the group consisting of thermosetting resins, carbon, silicon carbide and a refractory ceramic.

7. The composite piece of claim 1, wherein each superposed layer is spread from the inside face to the outside face of the reinforcing structure in a direction which forms an angle of up to 90 with the longitudinal axis of the structure.

8. The composite piece of claim 7, wherein the angle is an acute angle.

9. The composite piece of claim 7, wherein the angle is an about 90° angle.

* * * * *

UNITED STATES PATENT AND TRADEMARK OFFICE
CERTIFICATE OF CORRECTION

PATENT NO. : 4,780,346

DATED : October 25, 1988

INVENTOR(S) : Jean D. Denoel

It is certified that error appears in the above-identified patent and that said Letters Patent is hereby corrected as shown below:

On the title page, the assignee should read as follows:

[73] Assignee: Societe Europeenne de Propulsion, France

Signed and Sealed this

Fourteenth Day of November, 1989

Attest:

JEFFREY M. SAMUELS

*Attesting Officer*     *Acting Commissioner of Patents and Trademarks*